US012644977B2

(12) United States Patent
Umeki

(10) Patent No.: US 12,644,977 B2
(45) Date of Patent: Jun. 2, 2026

(54) OBJECT DETECTION DEVICE

(71) Applicant: DENSO WAVE INCORPORATED, Chita-gun (JP)

(72) Inventor: Shunsuke Umeki, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 267 days.

(21) Appl. No.: 18/607,827

(22) Filed: Mar. 18, 2024

(65) Prior Publication Data

US 2024/0319355 A1 Sep. 26, 2024

(51) Int. Cl.
*G01S 13/56* (2006.01)

(52) U.S. Cl.
CPC .................................... *G01S 13/56* (2013.01)

(58) Field of Classification Search
CPC ......... G01S 13/56; G01S 17/04; G01S 7/4813
See application file for complete search history.

(56) References Cited

U.S. PATENT DOCUMENTS

| | | | | |
|---|---|---|---|---|
| 2009/0289791 A1* | 11/2009 | Onishi | ..................... | G01V 8/18 |
| | | | | 340/555 |
| 2020/0307454 A1* | 10/2020 | Winberg | ................. | G01S 17/04 |
| 2022/0089129 A1* | 3/2022 | Krishnan | .............. | G01S 7/4813 |
| 2022/0229158 A1* | 7/2022 | Ye | .......................... | G01S 7/4813 |

* cited by examiner

*Primary Examiner* — Timothy J Thompson
*Assistant Examiner* — Rhadames Alonzo Miller
(74) *Attorney, Agent, or Firm* — Oliff PLC

(57) ABSTRACT

To prevent shielding reliability from the outside and operator's workability from lowering, an object detection device is provided with an enclosure having first and second extension surfaces. At a virtual crossing point, the first and second extension surfaces, which are extended from first and second surfaces of the enclosure, virtually crosses with each other, the enclosure has an opposing portion with first and second enclosure-side connectors. A detachable member has a cable-side connector and a cable-drawn portion. A cable is drawn from the cable-drawn portion. The detachable member is selectively and detachably connected to the opposing portion in a selected direction facing the first or second surface, using the first or second enclosure-side connector. In the attached state, the detachable member shields all the connectors from the outside.

14 Claims, 9 Drawing Sheets

[COMPARATIVE EXAMPLE]

[COMPARATIVE EXAMPLE]

FIG.15

OBJECT DETECTION DEVICE

CROSS-REFERENCE TO RELATED APPLICATION

This application is based on and claims the benefit of priorities from earlier Japanese Patent Applications No. 2023-045637 filed Mar. 22, 2023, the description of which is incorporated herein by reference.

BACKGROUND

Technical Field

The present disclosure relates to an object detection device for detecting objects, and in particular, to an object detection device which uses a light beam such as a laser beam to be scanned to the outside field around the object detection device.

Related Art

Object detection devices that detect the presence and movement of objects in a non-contact manner have been widely used in the past. One of these object detection devices using a laser beam (detection light) in a beam strip is known, for example, in Patent Document 1. The device described in this document is formed as an area sensor that emits detection light while changing the emission direction and detects intruders in the monitored area based on the reflected light. In general, an area sensor is connected to cables for power supply and communication. Specifically, the cable-side connector connected to the cable is connected to the enclosure-side connector on the enclosure of the area sensor.

PRIOR ART REFERENCE

Patent Documents

[Patent Reference 1] JP-A-2009-282640

Problems to be Solved

By the way, the area sensor (serving as an object detection device) is restricted in terms of orientation and location in relation to the monitoring area where objects are detected. In such cases, the appropriate direction to lead the cable out from the area sensor will vary depending on the installation configuration of the area sensor. For example, if the back of the area sensor is fixed to a wall, the cable should be led out downwards the area sensor. If the underside of the area sensor is fixed to the top of the stand, the cable should be led out behind or to the side of the area sensor.

Therefore, it is conceivable to provide the enclosure of the area sensor with a first enclosure-side connector to which the cable-side connector can be connected from the rear and a second enclosure-side connector to which the cable-side connector can be connected from below. In this connection configuration, the unused enclosure-side connector may be shielded from the outside by a lid. However, there will be concern about forgetting to attach the lid to the enclosure. If such an installation is forgotten, there is a risk of the unused enclosure-side connector being exposed to the outside. In this case, reliability for the task of shielding the enclosure-side connector from the outside may be reduced.

As an alternative to employing a conventional structure, a first cable-side component to draw the cable out behind the area sensor and a second cable-side component to draw the cable out below the area sensor could be provided. In this case, it is conceivable to use the first cable-side component and the second cable-side component differently depending on the installation configuration of the area sensor. However, if the installation configuration of the area sensor is changed from the original plan, or if such a change becomes necessary in actual fields, it is often necessary to purchase additional cable-side components and replace them. It may also reduce the user's workability.

SUMMARY

The present disclosure is provided to solve these problems, and the main objective is to suppress the decrease in reliability and user workability for shielding the enclosure-side connector from the outside in an object detection device with a configuration that allows the cable to be led out in multiple directions.

In order to realize the foregoing problem, as one mode, there is provided an object detection device to which a cable is connected, the object detection device includes an enclosure having a first surface and a second surface, and an opposing portion, the first and second surfaces each being extended to have first and second extension surfaces which cross at a virtual crossing position with each other, either one of the first and second surfaces being directly fixed to a fixed member, the opposing portion being formed on the enclosure to be opposed to the crossing position; and a detachable member is provided with a cable-drawn portion from which the cable is drawn outside and a cable-side connector connected to the cable. The detachable member is detachable to the opposing portion selectively between a first directed state where the cable-drawn portion is directed to cross the first surface and a second state where the cable-drawn portion is directed to cross the second surface.

The object detection device further includes a first enclosure-side connector arranged at the opposing portion and connectable to the cable-side connector in the first directed state; and a second enclosure-side connector arranged at the opposing portion and connectable to the cable-side connector in the second directed state. In this configuration, the detachable member is formed to shield, from an outside of the object detection device, the first enclosure-side connector, the second enclosure-side connector, and the cable-side connector when first and second connected states are established, the first connected state being a state where the cable-side connector is connected to the first enclosure-side connector, the second connected state being a state where the cable-side connector is connected to the second enclosure-side connector.

According to the above configuration, the enclosure has the first surface and the second surface. The first extension surface, which is a virtual extension of the first surface, and the second extension surface, which is a virtual extension of the second surface, cross each other. The fixed member is fixed to the first surface or the second surface. The cable is connected the object detection device. Therefore, if the first surface of the enclosure of the object detection device is fixed to the fixed member, the cable should be led out in the direction that the second surface of the enclosure faces. Meanwhile, if the second surface of the enclosure of the object detection device is fixed to the fixed member, the cable should be led out in the direction that the first surface of the enclosure faces.

The opposing portion is provided at the enclosure and is opposed to the intersection position where the first extension surface and the second extension surface intersect. The detachable member includes a cable-drawn portion from which said cable is drawn, and a cable-side connector connected to said cable. The detachable member is detachable to and from the opposing portion in a state where the cable-drawn portion faces the first surface and in a state where the cable-drawn portion faces the second surface.

The first enclosure-side connector is provided in the opposing portion and can be connected to the cable-side connector with the cable-drawn portion facing the first surface. Therefore, by connecting the cable-side connector to the first enclosure-side connector such that the detachable member is mounted to the opposing portion, the cable can be drawn out from the cable-drawn portion of the detachable member in the direction that the first surface of the enclosure faces.

The second enclosure-side connector is also provided in the opposing portion and can be connected to the cable-side connector with the cable-drawn portion facing the second surface. Therefore, by connecting the cable-side connector to the second enclosure-side connector such that the detachable member is mounted to the opposing portion, the cable can be drawn out from the cable-drawn portion of the detachable member in the direction that the second surface of the enclosure faces.

Furthermore, the state in which the cable-side connector is connected to the first enclosure-side connector and the state in which the cable-side connector is connected to the second enclosure-side connector are selectively provided. In both of these states, the detachable member shields the first enclosure-side connector, the second enclosure-side connector and the cable-side connector from the outside field of the device. This eliminates the need for additionally arranging a lid to shield the second enclosure-side connector from the outside when the cable-side connector is connected to the first enclosure-side connector. Also, when the cable-side connector is connected to the second enclosure-side connector, there is no need for additionally arranging a lid to shield the first enclosure-side connector from the outside.

Therefore, there is no concern of forgetting to attach the lid to the enclosure and exposing the unused enclosure-side connector to the outside. Since the enclosure-side connector is always shielded from the outside, loss of reliability is reduced.

In addition, there is no need to replace parts in both cases, in one of which the cable is withdrawn in a direction facing the first surface of the enclosure and in the other of which the cable is withdrawn in a direction facing the second surface of the enclosure. Therefore, even if the installation of the object detection device is changed from the original plan, no additional parts need to be purchased or replaced, and the user's workload can be reduced.

In the foregoing embodiment, it is preferred that the opposing portion includes first and second contacting surfaces which are symmetrical about a predetermined plane bisecting an angle provided between the first extension surface and the second extension surface, the detachable member includes a third contacting surface allowed to contact the first contacting surface and a fourth contacting surface allowed to contact the second contacting surface, which contacts are accomplished in the first connected states, the fourth contacting surface is allowed to contact the first contacting surface and the third contacting surface is allowed to contact the second contacting surface, which contacts are accomplished in the second connected state.

Since the first and second contacting surfaces of the opposing portion are symmetrical to each other with respect to the virtual predetermined plane bisecting the angle made between the first and second extension surfaces. Due to this symmetrical surface geometry, there can be provided, in a selective manner, a state where the cable-side connector is connected to the first enclosure-side connector with the detachable member loaded to the opposing portion and a further state where the cable-side connector is connected to the second enclosure-side connector with the detachable member loaded to the opposing portion. Hence, it is possible to provide the enclosure with a selective two-way connection modes, one of which is a connection of the dateable member to the enclosure in a direction facing one side surface of the enclosure, the other of which is a connection of the detachable member to the enclosure in a further direction facing another side surface of the enclosure, which is preferably a perpendicular side surface to the one side surface.

By the way, when the cable-side connector of the detachable member is connected to the first enclosure-side connector in a sate where the connecting direction is shifted from being perpendicular to the contacted surfaces on both the detachable member and the opposing portion of the enclosure, it is likely to cause a slide between the mutually touched surfaces. It is preferred that such a slide becomes too large.

In this respect, such a shift can be avoided by using guide mechanisms. That is, it is still preferred that the object detection device includes a first guide mechanism, the first guide mechanism is adapted to guide the cable-side connector toward the first enclosure-side connector, restrict a slide motion caused between the first and third contacting surfaces, and restrict a slide motion caused between the second and fourth contacting surfaces; and a second guide mechanism, the second guide mechanism is adapted to guide the cable-side connector toward the second enclosure-side connector, restrict a slide motion caused between the second and third contacting surfaces, and restrict a slide motion caused between the first and fourth contacting surfaces.

In this configuration, thanks to the first and second guide mechanisms which prevent or suppress an excessive shift, thereby providing a reliable connected state as well as making user's connecting work easier and quicker.

By way of example according to the first and second guide mechanisms, it is preferred that the first guide mechanism includes a pin, the pin being arranged on the detachable member and extended in a connection direction given by the cable-side connector, the pin being formed to be insertable in a first hole, the first hole being formed in the opposing portion and formed to extend in a first connecting direction along which the cable-side connector is connected to the first enclosure-side connector, and the second guide member includes a pin which is also insertable into a second hole, the second hole being formed in the opposing portion and formed to extend in a second connecting direction along which the cable-side connector is connected to the second enclosure-side connector.

It is still preferred that the object detection device includes a fastener configured to tighten the detachable member to the opposing portion for fixing in both of the first and second connected states.

According to another mode of the present disclosure, there is provided an object detection device to which a cable is connected. The object detection device includes:

an enclosure having a first and a second surface, and an opposing portion, the first and second surfaces each being extended to have first and second extension surfaces which crosses at a virtual crossing position each other, either one of the first and second surfaces being directly fixed to a fixed member, the opposing portion being formed on the enclosure to be opposed to the crossing position;

a detachable member is provided with a cable-drawn portion from which the cable is drawn outside and a cable-side connector connected to the cable, wherein the detachable member is detachable to the opposing portion selectively between a first directed state where the cable-drawn portion is directed to cross the first surface and a second state where the cable-drawn portion is directed to cross the second surface; and an enclosure-side connector arranged at the opposing portion and configured to be connectable to the cable-side connector in both the first and second directed states, wherein the detachable member is configured to shield, from an outside of the object detection device, both the enclosure-side connector and the cable-side connector in first and second directed and connected states, the first directed and connected state is a state where the cable-drawn portion is directed to the first surface and the cable-side connector is connected to the enclosure-side connector, the second directed and connected state being a state where the cable-drawn portion is directed to the second surface and the cable-side connector is connected to the enclosure-side connector.

Hence, according to the further configuration stated above, it is also possible to provide the enclosure with selective two-way connection modes in the same way as that described.

In both connected states between the datable member and the frame, i.e., the opposing portion, the detachable member can be used to a lid or cover which shields over the opposing portion. Hence, when the cable-side connector is connected to the enclosure-side connector, there is no need for another lid to shield the enclosure-side connector from the outside. Therefore, there is no risk of forgetting to attach the lid to the enclosure, and the reliability of shielding the enclosure-side connector from the outside can be suppressed. In addition, there is no need to replace parts between when the cable is lead out in the direction facing the first surface of the enclosure and when the cable is lead out in the direction facing the second surface of the enclosure. Therefore, even if the installation of the object detection device is changed from the original plan, there is no need to purchase or replace additional parts, and the user's workload can be reduced.

It is preferred in the forgoing configuration that the opposing portion includes first and second contacting surfaces which are symmetrical about a predetermined plane bisecting an angle provided between the first extension surface and the second extension surface, the detachable member includes a third contacting surface allowed to contact the first contacting surface and a fourth contacting surface allowed to contact the second contacting surface, which contacts are accomplished in the first directed and connected state,

the fourth contacting surface is allowed to contact the first contacting surface and the third contacting surface is allowed to contact the second contacting surface, which contacts are accomplished in the second directed and connected state.

Hence, according to this configuration, it is also possible to provide the enclosure with selective two-way connection modes in the same way as that described.

In this configuration, by way of example, there can be provided a fastener that fastens the detachable member such that the detachable member is fixed to the opposing portion. This fastener makes it possible to prevent or suppress a shift which may caused between the opposing portion and the detachable member after the conditions of the detachable member which can be selected by a user, depending on how the frame of the object detection device is arranged in various sites.

In addition, the enclosure-side connector and cable-side connector can be prevented from being damaged when the user catches on the cable, for example.

BRIEF DESCRIPTION OF THE DRAWINGS

In the accompanying drawings;

FIG. 15 is a side view pictorially illustrating a further modification of the connector.

DETAILED DESCRIPTION OF THE PREFERRED EMBODIMENTS

An embodiment materialized in an area sensor that monitors object intrusion into a factory monitoring area is described below, with reference to FIGS. 1 to 11, and FIGS. 16A and 16B.

Figure 1:
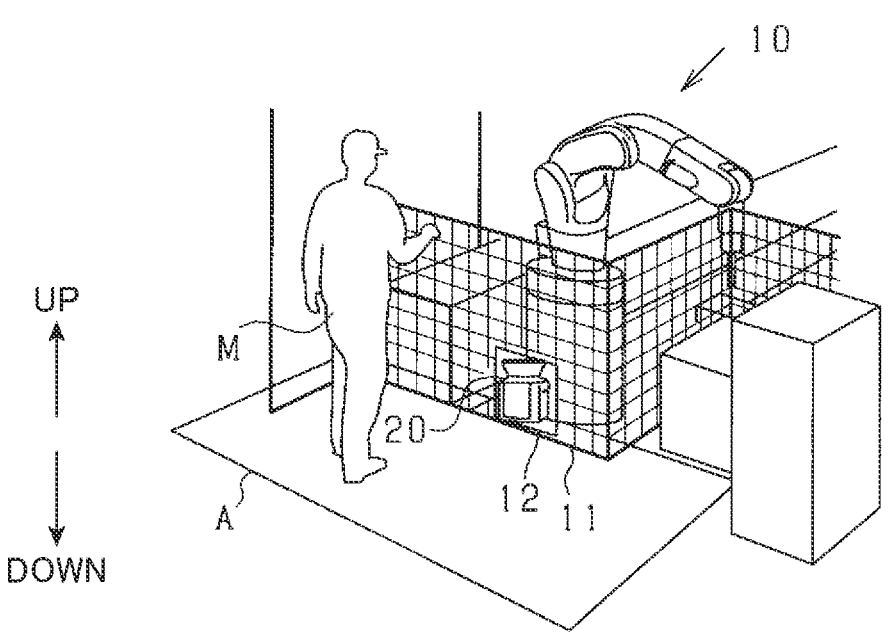
FIG. 1 is a perspective view showing an installation environment in which an area sensor according to an embodiment of the present disclosure is installed.

As shown in FIG. 1, an industrial robot 10 is installed in the factory. The robot 10 is fixed to the factory floor, for example. The robot 10 is surrounded by a fence 11. The fence 11 (partition member) extends vertically (upward) from the floor and has a predetermined width that allows the robot 10 to be isolated. An area sensor 20 is attached to the lower part (predetermined portion) of the fence 11 via a support plate 12 (functioning as s fixed member). That is, the area sensor 20 is fixed to the support plate 12, and the support plate 12 is fixed to the fence 11.

The area sensor 20 (serving as an object detection device) is a wide-angle ranging radar that uses a beam of laser light to scan an abbreviated 190° detection range (predetermined range) ahead. The area sensor 20 is configured to project a laser beam while scanning an area A (detection range) at predetermined angles in plan view. Furthermore, the area sensor 20 receives reflected light returned by laser beams reflected by various objects and detects objects in the area A based on the received data. For example, infrared, visible, and ultraviolet lasers can be used as laser beams. For example, the area A is a rectangular area with a predetermined area at a predetermined height corresponding to the below-knee part of a worker M and set at a predetermined location in the factory. The area sensor 20 gives an alarm if it detects the worker M (object) in the area A.

The area sensor 20 includes a light emitter that emits a pulsed and beam-like laser beam at each predetermined scanning angle θ, a light receiver that receives the reflected light of the laser beam emitted by the light emitter and reflected by an object, and a distance calculator that calculates the distance to the object. The distance calculation section calculates the distance ranging from the light emitting section (whose position is the same as that of the area sensor 20) to the object for each light emitting direction based on the time from the time the laser beam is emitted by the light emitting unit to the time the reflected light is received by the light receiving unit. In other words, the distance calculation unit calculates the distance from the area sensor 20 to the object in proportion to the time elapsed from the time the laser beam is emitted to the time the reflected light is received.

Figure 2:
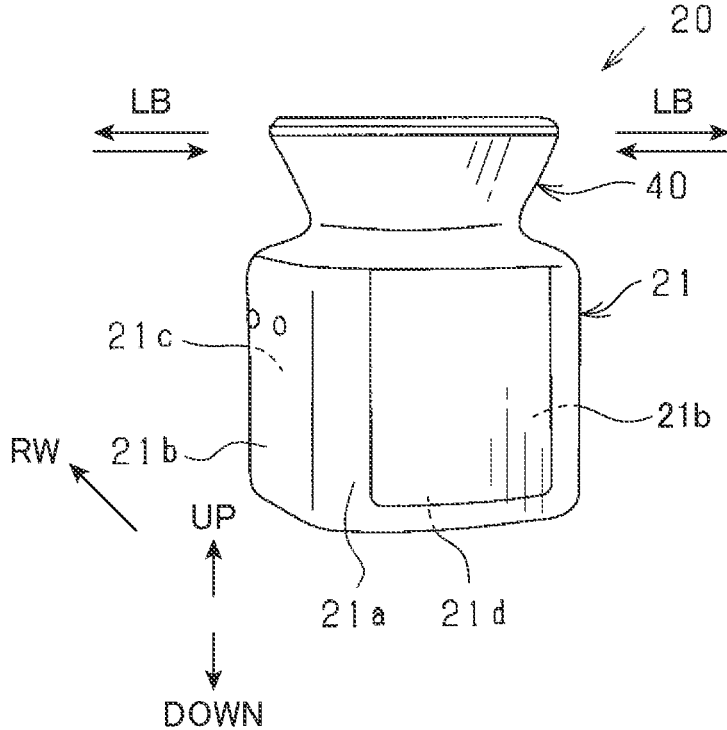
FIG. 2 is a perspective view of the area sensor.

FIG. 2 shows a diagram of the area sensor 20. The area sensor 20 has an enclosure 21 and a sensor unit 40. The sensor unit 40 is cylindrical in shape. A laser beam LB is emitted externally from the sensor unit 40, and the reflected light returned by the objects is incident internally from the sensor unit 40. The enclosure 21 is formed in the shape of a square column (rectangular). The enclosure 21 has a front surface 21a, two sides surface 21b, a rear surface 21c, and a bottom surface 21d. Each surface may be connected smoothly by curved surfaces, and the connection of each surface may be rounded.

Here, if the disclosure is not implemented in the area sensor 20, the cable is often restricted in the direction of withdrawal. This limitation is illustrated using the reference examples in FIGS. 3 and 4.

Figures 3, 4:
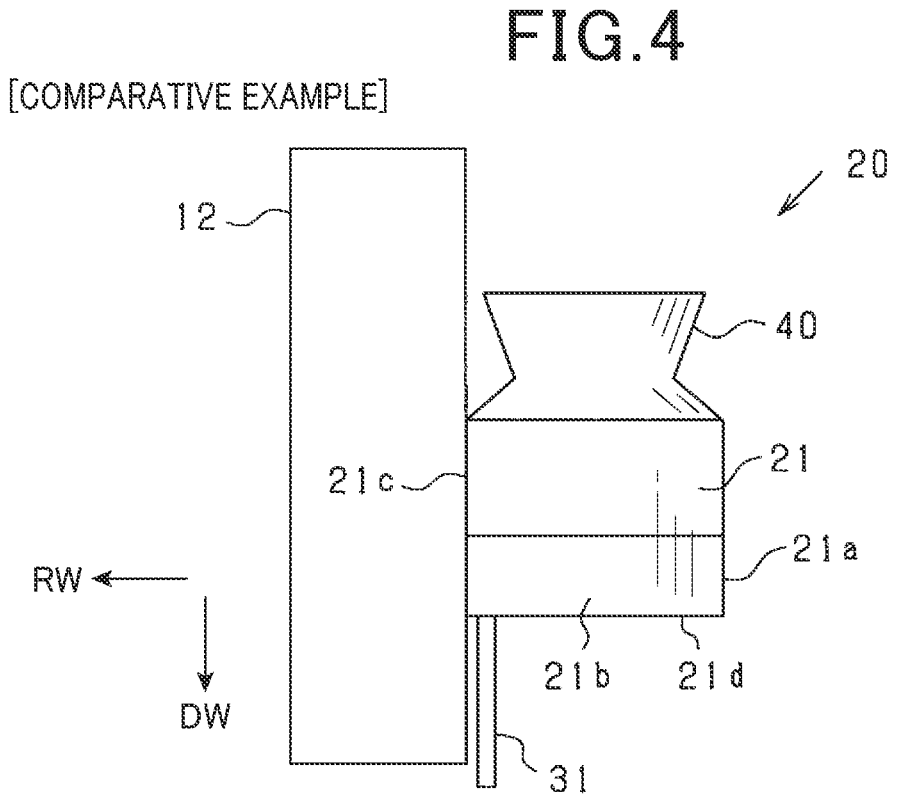
FIG. 3 is a side view exemplifying an installation mode in which the area sensor is installed on a base.
FIG. 4 is a side view exemplifying another installation mode in which the area sensor is installed on a support plate.

The reference example shown in FIG. 3 is a schematic diagram of a situation in which the area sensor 20 is installed on a platform 13. In this case, the bottom surface 21d (serving as a second surface) of the enclosure 21 is fixed to the top surface of the platform 13 (fixing member). A cable 31 is connected to the area sensor 20. The cable 31 includes power supply cables that supply electrical power and communication cables that send and receive signals. It is not possible to lead the cable 31 down the enclosure 21 in the up-down direction DW, in this example. Therefore, the cable 31 is led out rearwards from the enclosure 21 (in the front-back direction RW along which the rear surface 21c (serving as a first surface) is exposed (open) to the outside. Even when the area sensor 20 is fixed (or installed) on the top surface of the floor (serving as a fixed member), the conditions for cable withdrawal are the same as those shown in FIG. 3.

The reference example shown in FIG. 4 is a schematic diagram of the manner in which the area sensor 20 is installed on the support plate 12. In this case, the rear surface 21c (first surface) of the enclosure 21 is fixed to the front surface (serving as a front side surface) of the support plate 12. In this example, the cable 31 cannot be led out rewards from the enclosure 21 in the front-back direction RW. Therefore, the cable 31 is drawn downward in the enclosure 21 (in the up-down direction DW along which the bottom surface 21d (serving as a second surface) is exposed (open) outside. Even when the area sensor 20 is fixed (or installed) on the side of a wall (serving as a fixed member) or a member extending in the vertical direction (, which corresponds to a fixed member), the conditions for cable withdrawal are the same as those shown in FIG. 4.

As can be seen from the reference example showing cable withdrawal limitations shown in FIGS. 3 and 4, it is highly desirable and beneficial to be able to change the direction in which the cable 31 is led out (configurable) according to the installation configuration of the area sensor 20. Therefore, in this embodiment, the area sensor 20 has the following configuration to enable changing the direction in which the cable 31 is led out.

Figures 5, 6:
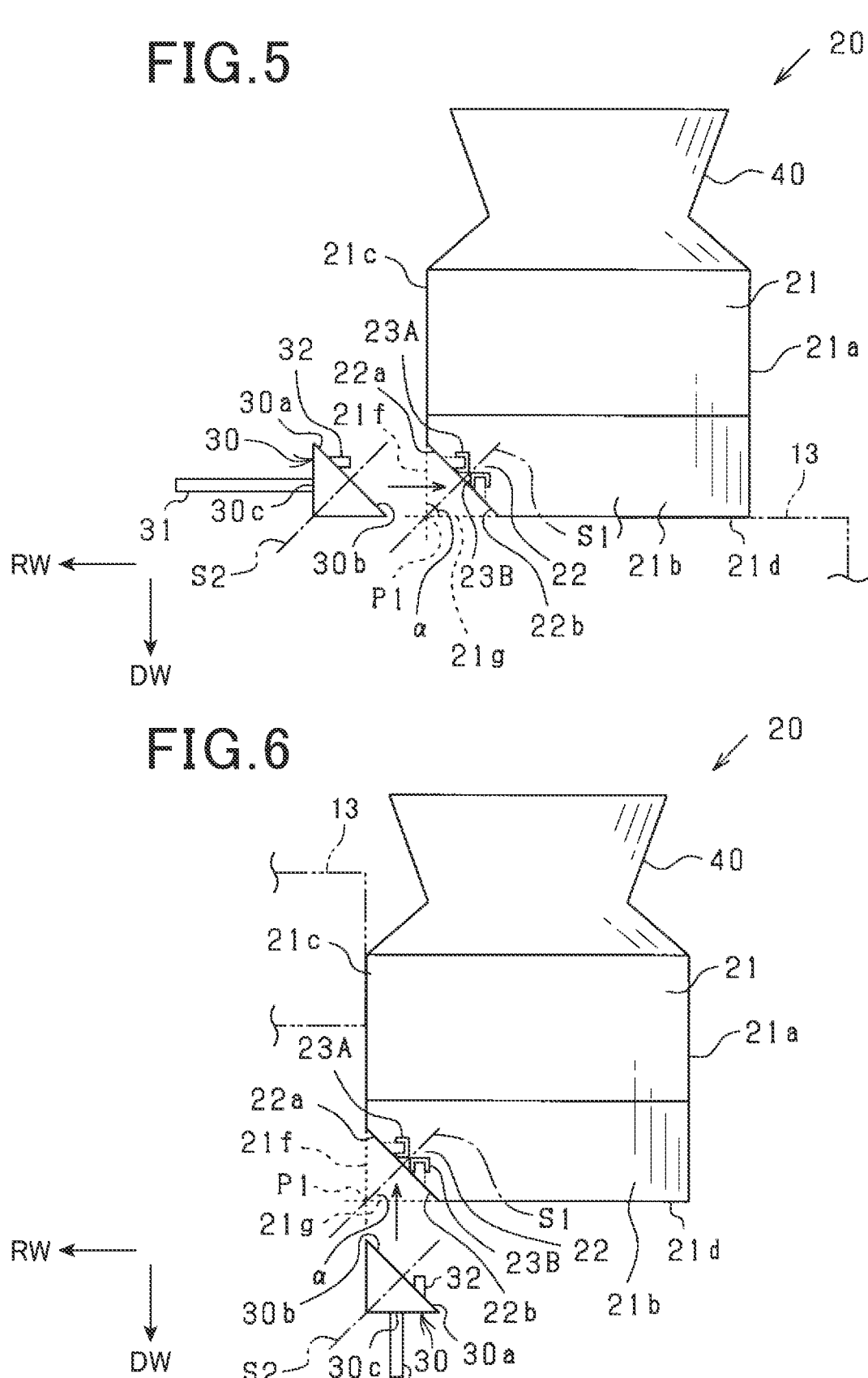
FIG. 5 is a side view illustrating a situation in which a detachable member is attached from a rear side of the area sensor to an enclosure of the area sensor.
FIG. 6 is a side view illustrating a situation in which the detachable member is attached from the bottom side of the area sensor to the enclosure of the area sensor.

As shown in FIG. 5, the area sensor 20 has a detachable member 30 that can be attached to and detached from the enclosure 21. The enclosure 21 is formed such that the enclosure 21 is partially cut away so as to produce, as a single independent part, the detachable member 30, to which the detachable member 30 is still detachably fit to restore, as if, the original entire appearance of the enclosure 21. In other words, the enclosure 21 and the detachable member 30 are split into mutually detachable parts.

This detachable structure is described in detail below.

As can be seen from FIG. 5, a first extension surface 21f, a virtual extension of the rear surface 21c of the enclosure 21, and a second extension surface 21g, a virtual extension of the bottom surface 21d, intersect vertically. The enclosure 21 has an opposing portion 22 opposite an intersection position P1 of the first extension surface 21f and the second extension surface 21g. In other words, the rear side and part of the lower part of the enclosure 21 are connected to form the opposing portion 22.

The opposing portion 22 is symmetrical with respect to a virtual plane S1 (serving as a predetermined virtual plane) that virtually bisects the angle α formed by the virtual first and second extension surfaces 21f and 21g. For this reason, the opposing portion 22 has a first contacting surface 22a and a second contacting surface 22b, which are plane symmetrical with respect to the plane S1. The first contacting surface 22a and the second contacting surface 22b are on the same plane. The first contacting surface 22a and second contacting surface 22b form a face-aligned surface. This face-aligned surface (opposing portion 22) is inclined by 45° to the hypothetical first extension surface 21f. Similarly, the above face-aligned surface is also inclined by 45° to the hypothetical second extension surface 21*g*.

As shown in FIG. 5, in the opposing portion 22, a first enclosure-side connector 23A is provided so that it is submerged within the first contacting surface 22*a* thereof. The first enclosure-side connector 23A is a groove-shaped (female) connector and opens in the direction that the rear surface 21C of the enclosure 21 is exposed outside. The first enclosure-side connector 23A is connected, via wiring, to a microcontroller or other device that has the function of the distance calculation unit of the area sensor 20.

In the opposing portion 22, a second enclosure-side connector 23B is provided so that it is submerged within the second contacting surface 22*b* thereof. The second enclosure-side connector 23B is a groove-shaped (female) connector and opens in the direction that the bottom surface 21*d* of the enclosure 21 faces. The second enclosure-side connector 23B is symmetrically positioned and oriented with respect to the first enclosure-side connector 23A in the plane S1. The second enclosure-side connector 23B has the same shape as the first enclosure-side connector 23A and is symmetrically positioned and oriented with respect to the virtual plane S1. The second enclosure-side connector 23B is connected via wiring to a microcontroller or other processing device that provides the function of the distance calculation unit to the area sensor 20. In other words, the destination of the first enclosure-side connector 23A is the same as the destination of the second enclosure-side connector 23B.

The detachable member 30 is formed in a shape that is line symmetrical with respect to a virtual plane S2. The plane S2 is a plane that virtually bisects the right-angled corner of the detachable member 30, which is formed in the shape of a right-angled isosceles triangular prism, when viewed in orthogonal section. The detachable member 30 includes a third contacting surface 30*a* and a fourth contacting surface 30*b*, which are line symmetrical with respect to the plane S2. The third contacting surface 30*a* and the fourth contacting surface 30*b* are on the same plane. The shape and size of the third contacting surface 30*a* is the same (or nearly the same) as the shape and size of the first contacting surface 22*a*. The shape and size of the fourth contacting surface 30*b* is the same (or nearly the same) as the shape and size of the second contacting surface 22*b*.

The detachable member 30 has a cable-drawn portion 30*c* from which a cable 31 is drawn and a cable-side connector 32 that is connected to the cable 31. The cable 31 may be connected to the cable-side connector 32 via a not-shown connector (connecting member) or the cable 31 may be connected directly. The cable-side connector 32 is located on the third contacting surface 30*a* of the detachable member 30. The cable-side connector 32 is a plate-type (male) connector. This cable-side connector 32 extends in a direction inclined at a 45° angle to the third contacting surface 30*a*, i.e., parallel to the direction in which the cable 31 is drawn out. The connector 32 has a predetermined width perpendicular to the direction of its extension. The first enclosure-side connector 23A and the second enclosure-side connector 23B can be formed as a plate-type (male) connector, and the cable-side connector 32 can be formed as a groove-type (female) connector.

With the cable-drawn portion 30*c* facing the rear surface 21*c* of the enclosure 21 in the back-front direction RW, the cable-side connector 32 can be connected to the first enclosure-side connector 23A. In other words, the cable-side connector 32 can be connected to the first enclosure-side connector 23A with the rear surface 21*c* facing rearwards (the left direction in FIG. 5) and the cable-drawn portion 30*c* directed in the same rearward direction in the front-back direction RW in FIG. 5). Therefore, when the cable-side connector 32 is connected to the first enclosure-side connector 23A, the third contacting surface 30A is touched to the first contacting surface 22A of the opposing portion 22, and at the same time, the fourth contacting surface 30B is touched to the second contacting surface 22B of the opposing portion 22. Thus, the detachable member 30 is configured to be attachable to the opposing portion 22 with the cable-drawn portion 30*c* facing the rear surface 21*c* of the enclosure 21 in the front-back direction RW.

As shown in FIG. 6, the cable-side connector 32 can be connected to the second enclosure-side connector 23B with the cable-drawn portion 30*c* directed in the up-down direction DW along which the bottom surface 21*d* of the enclosure 21 is exposed outside downwardly. In other words, the cable-side connector 32 can be connected to the second enclosure-side connector 23B in the up-down direction DW, in which the bottom surface 21*d* is exposed outside and downwards, as shown in FIG. 6. Therefore, when the cable-side connector 32 is connected to the second enclosure-side connector 23B, the fourth contacting surface 30*c* is touched to the first contacting surface 22*a* of the opposing portion 22, and at the same time, the third contacting surface 30*a* is touched to the second contacting surface 22*b* of the opposing portion 22. Thus, the detachable member 30 is configured to be attachable to the opposing portion 22 with the cable-drawn portion 30*c* facing, in the up-down direction DW, the lower surface 21*d* of the enclosure 21.

Figure 7:
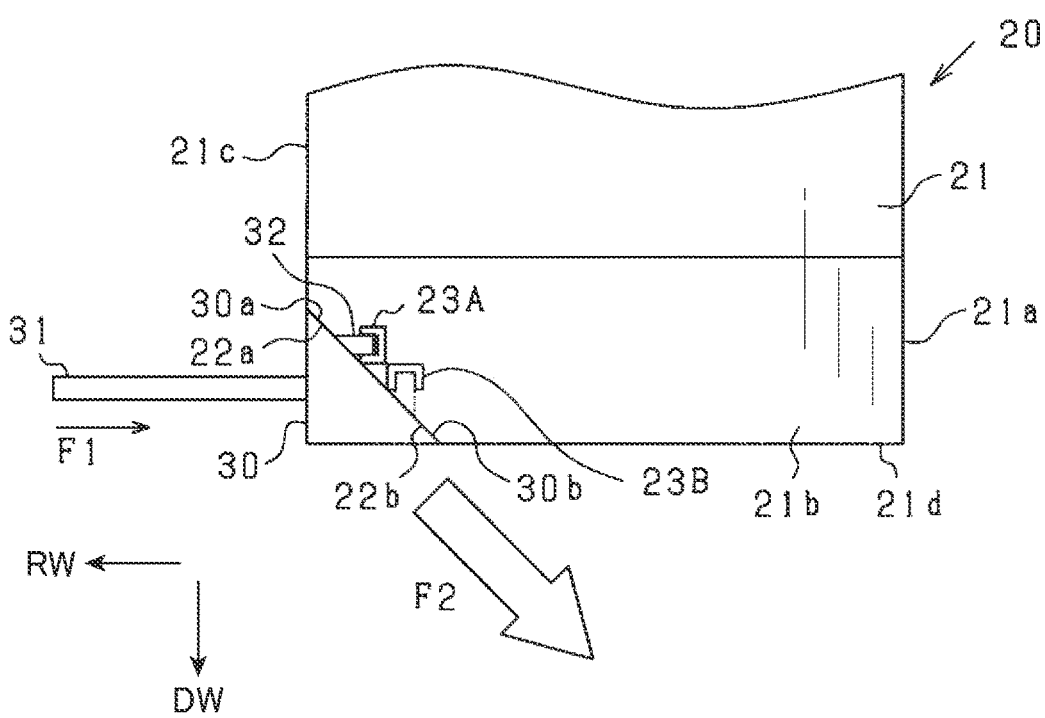
FIG. 7 is an illustration pictorially illustrating a force exerted when the detachable member is attached to the enclosure.
Figure 8:
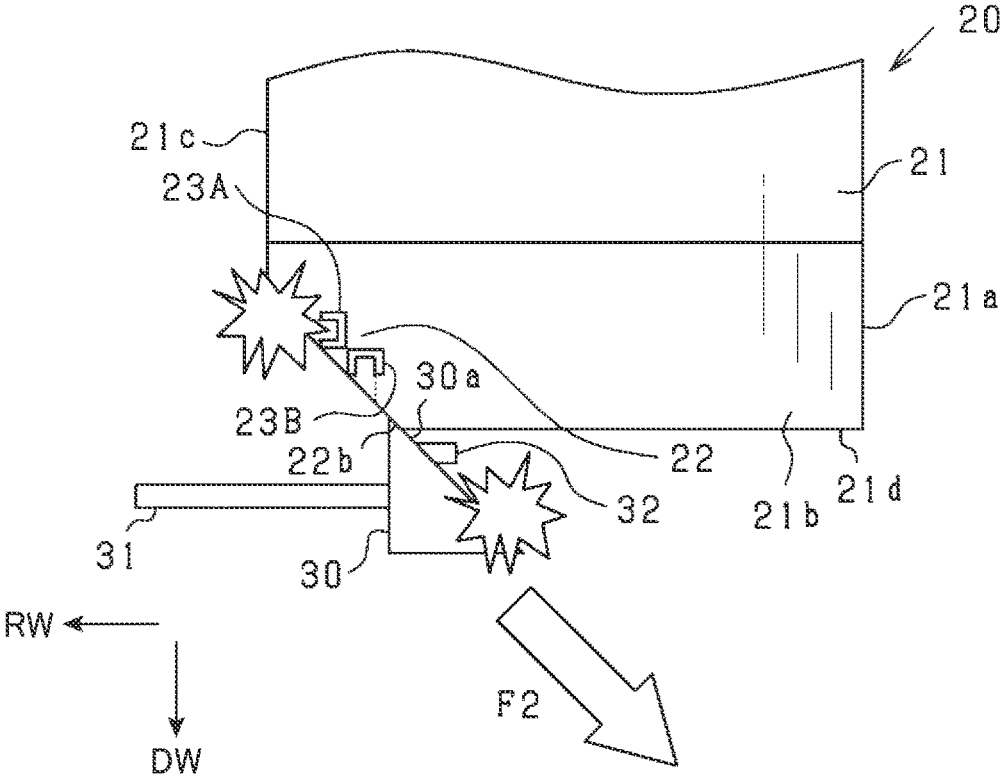
FIG. 8 is an illustration pictorially illustrating an attached situation of the detachable member in which a connector is damaged.

The coupling is shown in FIG. 7. In other words, connect the cable-side connector 32 to the first enclosure-side connector 23A from the rear of the enclosure 21. The third contacting surface 30*a* of the detachable member 30 contacts the first contacting surface 22*a* of the opposing portion 22. Furthermore, the fourth contacting surface 30*b* of the detachable member 30 contacts the second contacting surface 22*b* of the opposing portion 22. In this coupled state, if further force is applied to the detachable member 30, as indicated by an arrow F1, the following problems can occur. The contacting surfaces 22*a*, 22*b*, 30*a*, 30*b* are not perpendicular to the direction in which the cable-side connector 32 is connected to the first enclosure-side connector 23A (in the direction shown by the arrow F1). Therefore, the first contacting surface 22*a* and the third contacting surface 30*a* slide against each other, and the second contacting surface 22*b* and the fourth contacting surface 30*b* slide against each other. As a result, a force along the contacting surfaces 22*a*, 22*b*, 30*a*, 30*b* acts on the detachable member 30 as shown by an arrow F2. Therefore, as shown in FIG. 8, the first enclosure-side connector 23A and cable-side connector 32 may be damaged. The same problem can also occur when connecting the cable-side connector 32 to the second enclosure-side connector 23B from below the enclosure 21.

Figure 9:
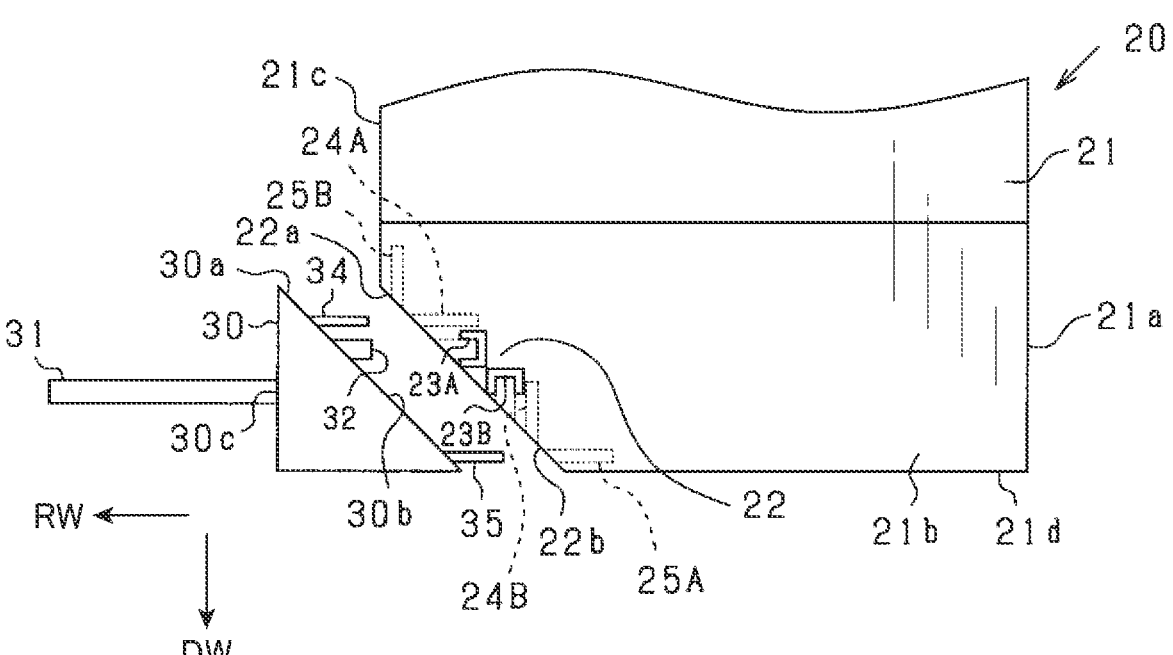
FIG. 9 is an illustration pictorially illustrating guide mechanisms for attachment.
Figure 10:
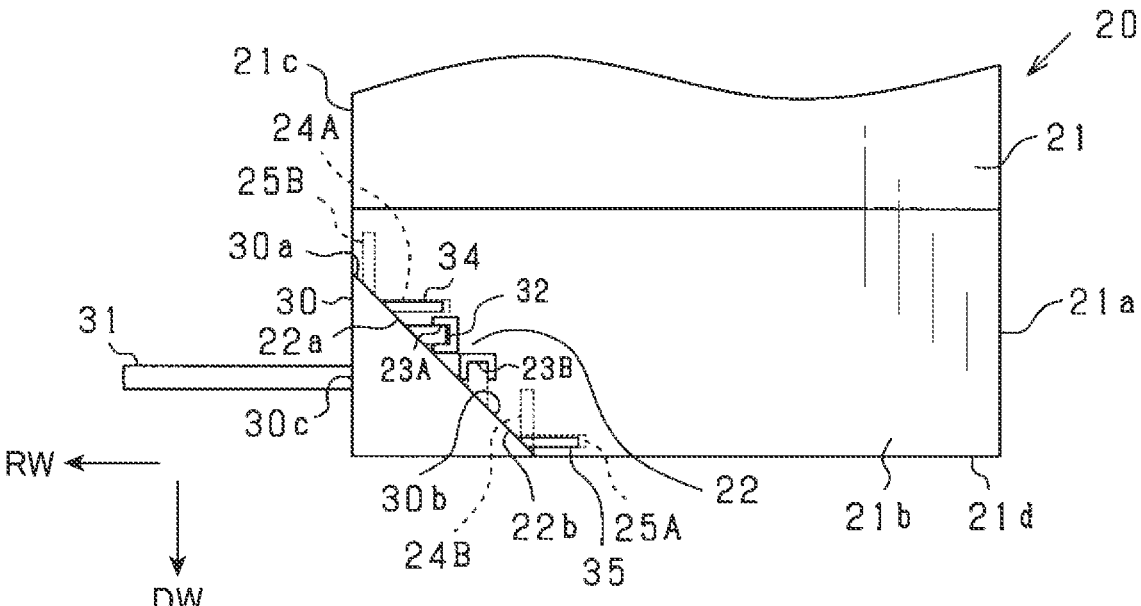
FIG. 10 is an illustration pictorially illustrating a connector connected to the enclosure.

Therefore, as shown in FIG. 9, in the area sensor 20, the cable-side connector 32 is provided as a first guide mechanism that performs a guiding function in the direction of the first enclosure-side connector 23A and prevents or suppresses sliding motions which may occur between the first contacting surface 22*a* and the third contacting surface 30*a*, and of the second contacting surface 22*b* and the fourth contacting surface 30*b*.

The first guide mechanism includes first holes 24A and 25A formed in the opposing portion 22 and extending in the first connecting direction to connect the cable-side connector 32 to the first enclosure-side connector 23A.

The first hole 24A is circular in cross section in the opposing portion 22 to the extent of the first contacting surface 22a. This first hole 24A extends perpendicular to the rear surface 21c of the enclosure 21 (parallel to the lower surface 21d). The other first hole 25A is circular in cross section in the opposing portion 22 to the extent of the second contacting surface 22b. This first hole 25A extends perpendicular to the rear surface 21c of the enclosure 21 (parallel to the lower surface 21d).

The first guide mechanism includes two pins 34 and 35. These pins 34 and 35 are provided on the detachable member 30 and extend in the first connecting direction (connection direction of the cable-side connector 32) and can be inserted into the first holes 24A and 25A, respectively. One of the pins 34 is cylindrical in shape and is attached to the extent of the third contacting surface 30a in the detachable member 30. The pin 34 extends in a direction inclined at a 45° angle to the third contacting surface 30a, i.e., parallel to the direction in which the cable 31 is led out. The outer diameter of this pin 34 is slightly smaller than the inner diameter of the first hole 24A described above. The other pin 35 is cylindrical in shape and is attached to the extent of the fourth contacting surface 30b in the detachable member 30. The pin 35 extends in a direction inclined at a 45° angle to the fourth contacting surface 30b, i.e., parallel to the direction in which the cable 31 is led out. The outer diameter of the pin 35 is slightly smaller than the inner diameter of the first hole 25A described above. The positions of pins 34 and 35 are set so that when the pin 34 is inserted in the first hole 24A, the pin 35 is inserted in the first hole 25A.

Then, by inserting the pin 34 into the first hole 24A and the pin 35 into the first hole 25A, the cable-side connector 32 is connected (inserted) to the first enclosure-side connector 23A. The positioning of the first enclosure-side connector 23A, cable-side connector 32, first holes 24A, 25A, and pins 34, 35 are set so that this connection can be made.

According to the first guide mechanism, when the cable-side connector 32 is brought closer to the first enclosure-side connector 23A, the pins 34 and 35 begin to enter each of the first holes 24A and 25A. With a portion of the pin 34 in the first hole 24A and a portion of the pin 35 in the first hole 25A, the detachable member 30 can only move in the first connecting direction to the opposing portion 22. In other words, it is restricted or prohibited that the detachable member 30 rotates with respect to the opposing portion 22 about the central axis of the cable 31 and that the detachable member 30 moves with respect to the opposing portion 22 in the direction along the contacting surfaces 22a and 22b. Then, by further inserting the pin 34 into the first hole 24A and the pin 35 into the first hole 25A, the cable-side connector 32 is connected to the first enclosure-side connector 23A. Then, by further inserting the pin 34 into the first hole 24A and the pin 35 into the first hole 25A, the third contacting surface 30a is in contact with the first contacting surface 22a and the fourth contacting surface 30b is in contact with the second contacting surface 22b. However, sliding motions cased between the first contacting surface 22a and the third contacting surface 30a, and between the second contacting surface 22b and the fourth contacting surface 30b, is regulated or prohibited by the pins 34 and 35 inserted into the first holes 24A and 25A, respectively.

Similarly, the area sensor 20 has a second guide mechanism. The second guide mechanism is configured to guide the cable-side connector 32 toward the second enclosure-side connector 23B and to prevents or suppresses sliding motions which may occur between the second contacting surface 22b and the third contacting surface 30a and sliding of the first contacting surface 22a and the fourth contacting surface 30b. This second guide mechanism has second holes 24B and 25B and the pins 34 and 35. The second holes 24B and 25B are formed in the opposing portion 22 and extend in the second connecting direction to connect the cable-side connector 32 to the second enclosure-side connector 23B. The pins 34 and 35 are provided in the detachable member 30 and extend in the second connecting direction (connection direction of the cable-side connector 32) and can be inserted into the second holes 24B and 25B, respectively.

Figure 11:
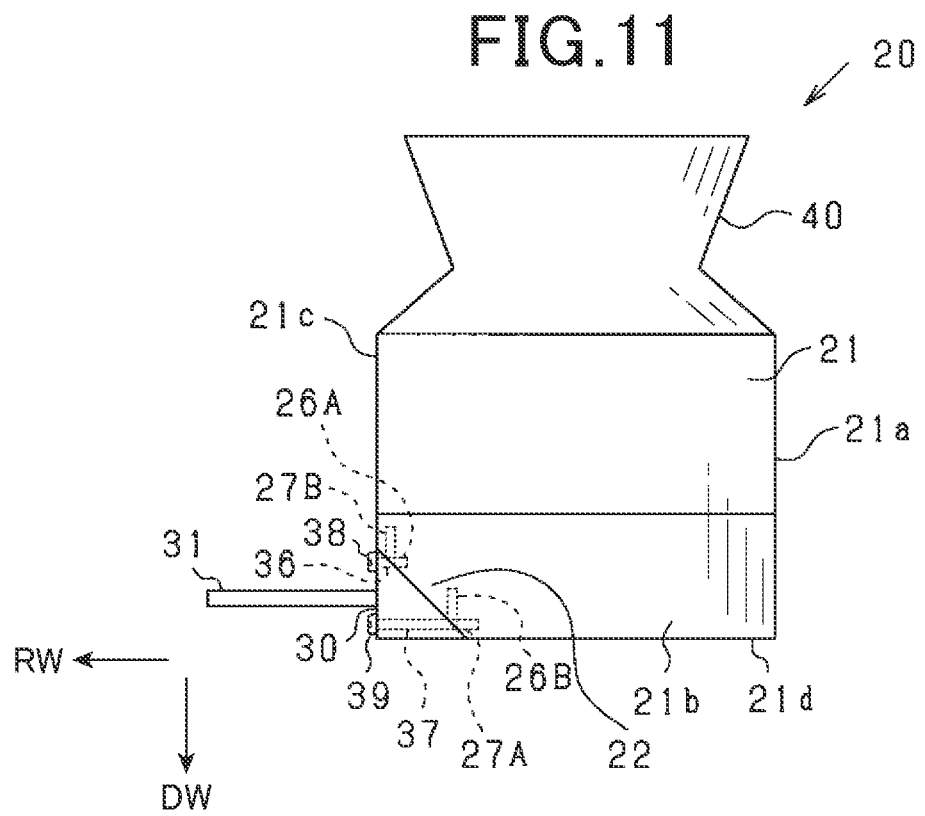
FIG. 11 is an illustration pictorially illustrating a detachable member fit to the enclosure with screws.

FIG. 11 shows a schematic diagram of the detachable member 30 secured to the enclosure 21 with screws 38 and 39. Opposing portion 22 have screw holes 26A and 27A for tightening the screws 38 and 39, respectively. The screw holes 26A and 27A are formed to extend perpendicular to the rear surface 21c of the enclosure 21. The detachable member 30 has insertion holes 36 and 37 through which the screws 38 and 39 can be inserted, respectively. The insertion holes 36 and 37 are formed to extend in the direction in which the cable 31 is drawn out (in the direction of connection of the cable-side connector 32). When the cable-side connector 32 is connected to the first enclosure-side connector 23A, the positions of the screw holes 26A and 27A, and the insertion holes 36 and 37 are aligned, respectively.

Therefore, the cable-side connector 32 is connected to the first enclosure-side connector 23A. After this connection, the screws 38 and 39 are inserted into the insertion holes 36 and 37, respectively, and these screws 38 and 39 are screwed into the screw holes 26A and 27A, respectively. The detachable member 30 is thus fastened to the opposing portion 22 by the screws 38 and 39. The screw holes 26A and 27A, the insertion holes 36 and 37, and the screws 38 and 39 functionally constitute a fastener. This fastener allows the detachable member 30 to be tightened and secured to the opposing portion 22 with the cable-side connector 32 connected to the first enclosure-side connector 23A. In FIGS. 5-11, the screw holes 26A and 27A, the insertion holes 36, and 37, and the screws 38 and 39 are omitted.

With the cable-side connector 32 connected to the first enclosure-side connector 23A, the detachable member 30 shields the first enclosure-side connector 23A, the second enclosure-side connector 23B, and the cable-side connector 32 from the outside. In other words, the detachable member 30 ensures that the first enclosure-side connector 23A, the second enclosure-side connector 23B, and the cable-side connector 32 are waterproof and dustproof to the outside.

Similarly, the opposing portion 22 has screw holes 26B and 27B for tightening the screws 38 and 39, respectively. The screw holes 26B, and 27B are formed to extend vertically on the lower surface 21d of the enclosure 21. To lead the cable 31 downward from the detachable member 30 (the area sensor 20), the detachable member 30 is attached to the opposing portion 22 as follows. In other words, when the cable-side connector 32 is connected to the second enclosure-side connector 23B, the positions of the screw holes 26B and 27B, and the insertion holes 36 and 37 match, respectively. The cable-side connector 32 is connected to the second enclosure-side connector 23B, and then the screws 38 and 39 are inserted into the insertion holes 36 and 37, respectively, and screwed into the screw holes 26B and 27B, respectively.

The detachable member 30 is then tightened by the screws 38 and 39 to secure it to the opposing portion 22. With the cable-side connector 32 connected to the second enclosure-side connector 23B, the detachable member 30 shields the first enclosure-side connector 23A, the second enclosure-side connector 23B, and the cable-side connector 32 from the outside. The screw holes 26B and 27B, the insertion holes 36 and 37, and the screws 38 and 9 functionally constitute a fastener. This fastener allows the cable-side connector 32 to be connected to the second enclosure-side connector 23B, and the detachable member 30 can be tightened to secure the detachable member 30 to the opposing portion 22.

Figure 16A:
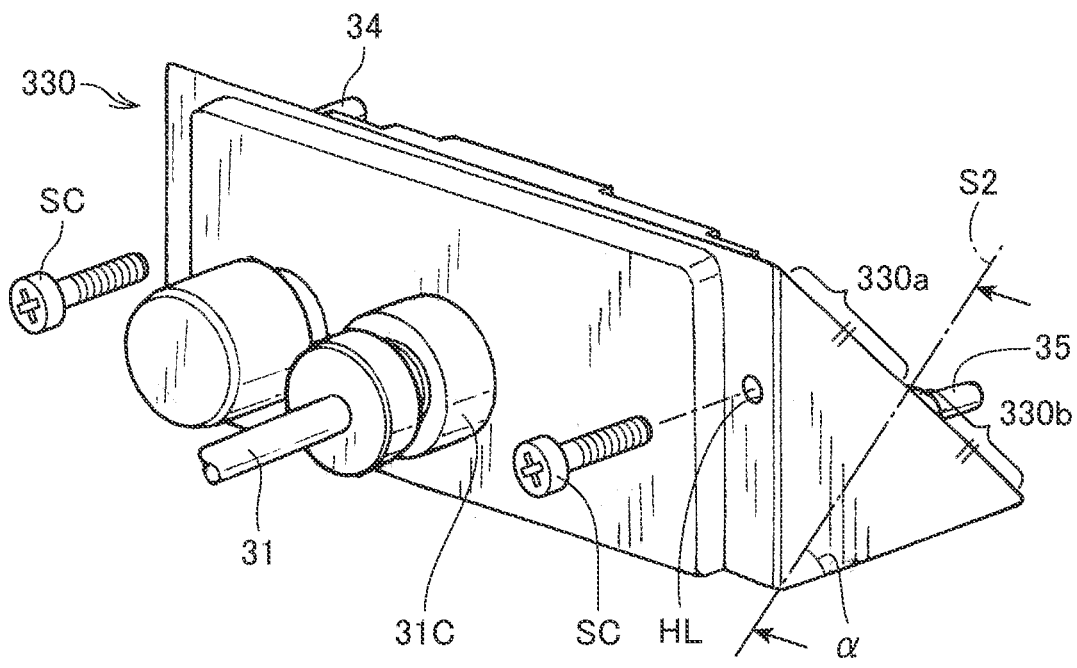
FIGS. 16A and 16B are perspective views exemplifying a more practical appearance of a detachable member which can be applied to the area sensor according to the embodiments.
Figure 16B:
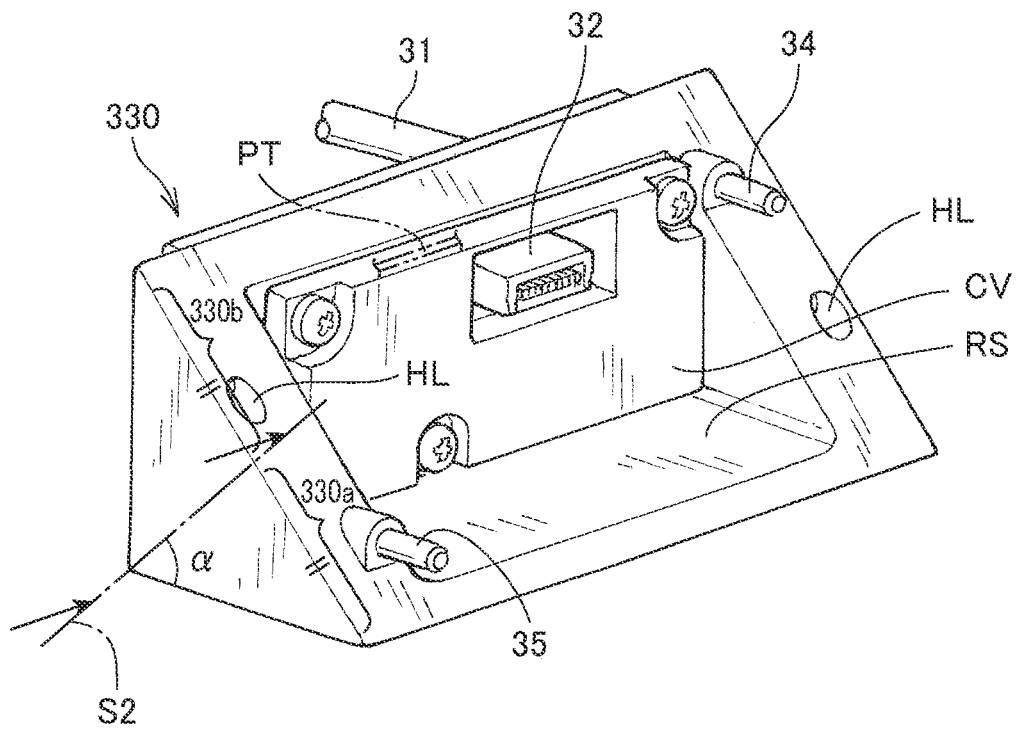

Reference t to FIGS. 16A and 16B, three-dimensional appearances of a more practical example of a detachable member 330 will now be described. This detachable member 330 is formed based on the foregoing detachable member 330, in which the components corresponding to those described in the foregoing example are numbered by the same numerals or symbols for a simplified explanation.

FIG. 16A is a perspective view obliquely showing the rear side of the detachable member 330 which is exposed to the outside when being attached to the opposing portion 22 of the enclosure 21 in both of the two directions, i.e., the directions to the rear and bottom surfaces 21c and 21d of the enclosure 21 in the front-back direction RW and up-down direction DW. Meanwhile, FIG. 16B is a further perspective view obliquely showing the front side of the detachable member 330 which is detachably attached to the opposing portion 22 of the enclosure 21.

As described, the detachable member 330 has a surface to be tightly attached to the opposing portion 22 of the enclosure 21, and this surface is virtually bisected by the virtual line S2, thereby providing mutually line-symmetrical surfaces which are the third contacting surface 30a and fourth contacting surface 30b. More specifically, the surface to be attached tightly to the opposing portion 22 has a recess RS whose opening is square. At the back of the recess RS, there is provided a cover CV in which a substrate PT interconnecting the cable-drawn portion 30c and the coble-side connector 32. The detachable member 230 has insertion holes HL through which the screws SC can be inserted for the detachable attachment, as described, in the two-way selective connection to the enclosure 21.

These perspective views make it possible to understand how the appearances of various types of datable members are, including not only the detachable member 30 explained in the foregoing embodiments but also detachable members which will be described later as modifications.

The area sensor 20 in the foregoing embodiment has the following advantages.

The corner of the enclosure 21 have the opposing portion 22 exposed to the space formed by cutting off a portion of the corners of the enclosure. This opposing portion 22 can also be said to oppose the intersection position P1 where the first extension surface 21f and the second extension surface 21g intersect.

The detachable member 30 includes the cable-drawn portion 30c from which the cable 31 is drawn, and the cable-side connector 32 that is connected to the cable 31. The detachable member 30 can selectively be attached to and detached from the opposing portion 22 in both of the first orientation in which the cable-drawn portion 30c faces the rear surface 21c of the enclosure 21 in the front-back direction RW and the second orientation in which the cable-drawn portion 30c faces the lower surface 21d of the enclosure 21 in the up-down direction DW.

In detail, the first enclosure-side connector 23A is located in the opposing portion 22. The first enclosure-side connector 23A can be connected to the cable-side connector 32 with the cable-drawn portion 30c facing the rear surface 21c of the enclosure 21 in the front-back direction RW, as shown in FIG. 5. This allows the cable-side connector 32 to be connected to the first enclosure-side connector 23A, so that the detachable member 30 can be attached to the opposing portion 22 with ease. Therefore, this allows the cable 31 to run outward from the enclosure 21 in the direction front-back direction RW in which the rear surface 21c of the enclosure 21 opens.

The second enclosure-side connector 23B is located in the opposing section 22. With the cable-drawn portion 30c facing the lower surface 21d of the enclosure 21 in the up-down direction DW, the second enclosure-side connector 23B can be connected to the cable-side connector 32. Therefore, the cable-side connector 32 is connected to the second enclosure-side connector 23B and the detachable member 30 is attached to the opposing portion 22. This allows the cable 31 to run outward from the enclosure 21 in the up-down direction DW in which the lower surface 21d of the enclosure 21 is exposed outside.

With the cable-side connector 32 connected to the first enclosure-side connector 23A and the cable-side connector 32 connected to the second enclosure-side connector 23B, the detachable member 30 shields the first enclosure-side connector 23A, second enclosure-side connector 23B, and cable-side connector 32 from the outside. Therefore, when the cable-side connector 32 is connected to the first enclosure-side connector 23A, a lid is not required to shield the second enclosure-side connector 23B from the outside.

In addition, when the cable-side connector 32 is connected to the second enclosure-side connector 23B, a lid is not required to shield the first enclosure-side connector 23A from the outside. Therefore, there is no risk of forgetting to install the lid on the enclosure 21 and exposing unused enclosure-side connectors to the outside. This prevents the reliability of shielding the enclosure-side connectors 23A and 23B from the outside world from deteriorating. The same detachable member 30 can be used for both leading out the cable 31 in the direction that the rear surface 21c of the enclosure 21 faces, and for leading out the cable 31 in the direction that the bottom surface 21d of the enclosure 21 is exposed outside. In other words, there is no need to replace parts that are detachable even when the direction of cable withdrawal is different. Therefore, even if the installation configuration of the area sensor 20 is changed from the original plan, no additional parts need to be purchased or replaced. This prevents the decrease in the user's workload.

The first and second contacting surfaces 22a and 22b, which form the surfaces of the opposing portion 22 that contact the detachable member 30, are symmetrical with respect to the plane S1 that bisects the angle $\alpha$ formed by the first and second extension surfaces 21f and 21g of the enclosure 21. With the cable-side connector 32 connected to the first enclosure-side connector 23A, the 10) third contacting surface 30a can be in contact with the first contacting surface 22a. Therefore, if the fourth contacting surface 30b can be touched to the second contacting surface 22b, the third contacting surface 30a can be touched to the second contacting surface 22b when the fourth contacting surface 30b is touched to the first contacting surface 22a. In this regard, with the cable-side connector 32 connected to the second enclosure-side connector 23B, the fourth contacting surface 30b can be touched to the first contacting surface 22a and the third contacting surface 30a can be touched to the second contacting surface 22b. Therefore, it is possible to selectively achieve a state in which the cable-side connector 32 is connected to the first enclosure-side connector 23A and the detachable member 30 is attached to the opposing portion 22, and a state in which the cable-side connector 32 is connected to the second enclosure-side connector 23B and the detachable member 30 is attached to the opposing portion 22.

The area sensor 20 is equipped with the first guide mechanism and the second guide mechanism. The first guide mechanism guides the cable-side connector 32 toward the first enclosure-side connector 23A and prevents or suppresses sliding motions which may occur between the first contacting surface 22a and the third contacting surface 30a and sliding of the second contacting surface 22b and the fourth contacting surface 30b. The second guide mechanism guides the cable-side connector 32 toward the second enclosure-side connector 23B and prevents or suppresses sliding motions which may occur between the second contacting surface 22b and the third contacting surface 30a and sliding of the first contacting surface 22a and the fourth contacting surface 30b.

According to this configuration, when connecting the cable-side connector 32 to the first enclosure-side connector 23A, the first guide mechanism can guide the cable-side connector 32 toward the first enclosure-side connector 23A. The first guide mechanism can also prevent or suppress sliding motions which may occur between the first contacting surface 22a and the third contacting surface 30a and the sliding motions which may be caused between the second contacting surface 22b and the fourth contacting surface 30b. This prevents excessive force from acting on the first enclosure-side connector 23A and the cable-side connector 32, even when the first contacting surface 22a of the opposing portion 22 and the third contacting surface 30a of the detachable member 30 (the second contacting surface 22b and the fourth contacting surface 30b) are not perpendicular to the direction in which the cable-side connector 32 is connected to the first enclosure-side connector 23A.

Similarly, when connecting the cable-side connector 32 to the second enclosure-side connector 23B, the second guide mechanism can guide the cable-side connector 32 toward the second enclosure-side connector 23B. The second guide mechanism can also suppress the sliding motions which may be caused between the second contacting surface 22b and the third contacting surface 30a and the sliding motions which may be caused between the first contacting surface 22a and the fourth contacting surface 30b.

The first guide mechanism includes first holes 24A, 25A formed in the facing portion 22 and extending in the first connecting direction for connecting the cable-side connector 32 to the first enclosure-side connector 23A, the pins 34 and 35, which are provided in the detachable member 30 and extend in the direction of connection of the cable-side connector 32 and can be inserted into first holes 24A and 25A respectively. The second guide mechanism includes the second holes 24B and 25B formed in the opposing portion 22 and extending in the second connecting direction to connect the cable-side connector 32 to the second enclosure-side connector 23B, and the pins 34 and 35 that can be inserted into the second holes 24B and 25B. Thus, sliding motions which may be caused between the first contacting surface 22a and the third contacting surface 30a, and between the second contacting surface 22b and the fourth contacting surface 30b can be suppressed or prevented by the pins 34 and 35 inserted into the first holes 24A and 25A, respectively.

Furthermore, when connecting the cable-side connector 32 to the first enclosure-side connector 23A, the rotation of the detachable member 30 with the cable 31 to the opposing portion 22 as the central axis can be limited or prevented.

Moreover, the relative movement of the opposing portion 22 and the detachable member 30 along the first contacting surface 22a, the second contacting surface 22b, the third contacting surface 30a, and the fourth contacting surface 30b is also limited or prevented. This also prevents damage to the first enclosure-side connector 23A, the second enclosure-side connector 23B, and the cable-side connector 32, even if the user catches on the cable 31 or other events occur. In a similar event, the pins 34 and 35 can receive the forces acting on the first enclosure-side connector 23A, the second enclosure-side connector 23B, and the cable-side connector 32. This prevents these connectors 23A, 23B, and 32 from being damaged.

A fastener is provided that can tighten the detachable member 30 and secure it to the opposing portion 22 when the cable-side connector 32 is connected to the first enclosure-side connector 23A and when the cable-side connector 32 is connected to the second enclosure-side connector 23B. Specifically, the fastener is composed of the screw holes 26A, 27A, 26B, 27B, the insertion holes 36, 37, and the screws 38, 39. According to such a configuration, it is possible to prevent the opposing portion 22 and the detachable member 30 from shifting after connecting the cable-side connector 32 to the first enclosure-side connector 23A or the second enclosure-side connector 23B. Therefore, first enclosure-side connector 23A, second enclosure-side connector 23B, and cable-side connector 32 can be prevented from being damaged even if a user catches on the cable 31 or other events occur.

Furthermore, according to this embodiment, there is no need to bend the cable 31 in order to change the direction in which the cable 31 is led out from the area sensor 20. Thus, it saves space compared to sensors that require extra space to bend the cable 31.

The above embodiment may be implemented with the following modifications. The same parts as in the above embodiment will be omitted from the explanation with same symbols.

Figure 12:
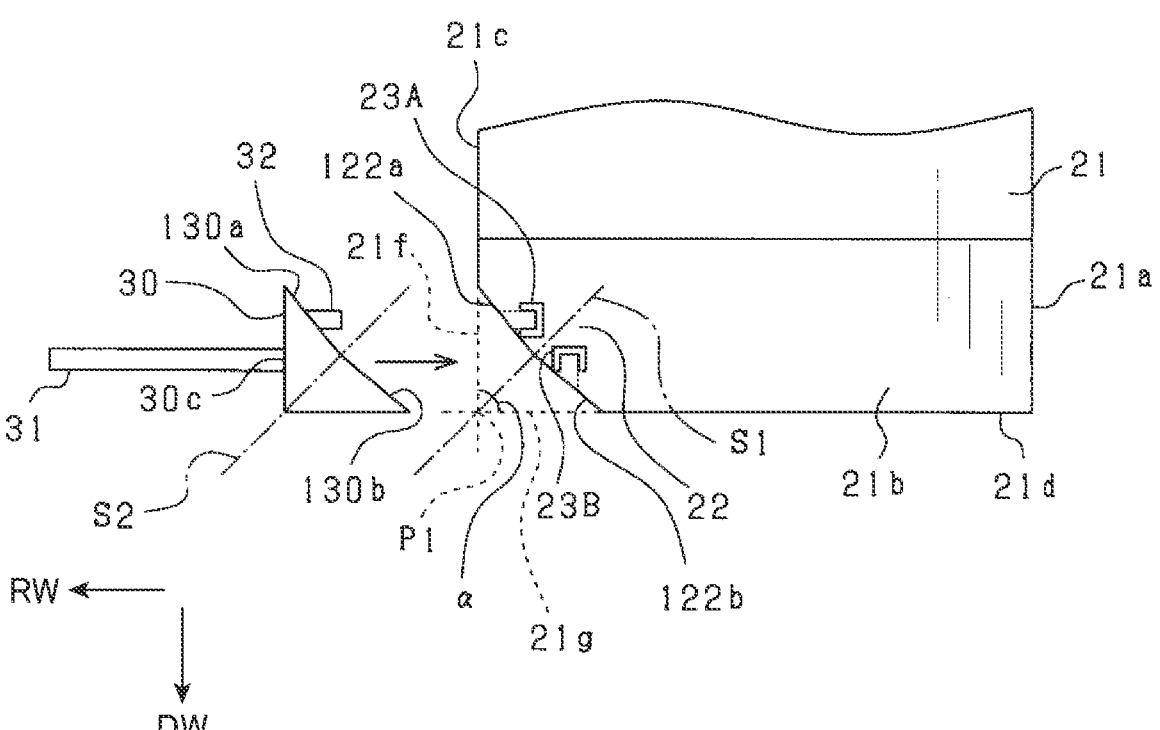
FIG. 12 is a side view pictorially illustrating a modification of both the opposing portion and the detachable member.

As shown in FIG. 12, a surface configuration in which a first contacting surface 122a and a second contacting surface 122b are not in the same plane can also be adopted. The first contacting surface 122a is a surface inclined to a first extension surface 21f by an angle smaller than 45°. The second contacting surface 122b is a surface inclined to a second extension surface 21g by an angle smaller than 45°. In this case, the opposing portion 22 is also formed symmetrically with respect to the plane S1 (predetermined plane) that bisects the angle α formed by the first extension surface 21f and the second extension surface 21g. The first contacting surface 22a and the second contacting surface 22b are plane symmetrical with respect to the plane S1.

Corresponding to the shape of the opposing portion 22, a third contacting surface 130a and a fourth contacting surface 130b can adopt a surface configuration that is not on the same plane. The shape and size of the third contacting surface 130a is the same (or nearly the same) as the shape and size of the first contacting surface 122a. The shape and size of the fourth contacting surface 130b is the same (or nearly the same) as the shape and size of the second contacting surface 122b. In this case, the detachable member 30 is also symmetrical with respect to the virtual plane S2. The third contacting surface 130a and the fourth contacting surface 130b are plane symmetrical with respect to the plane S2. This surface configuration can also produce the same effects as the embodiment.

The surface can be configured so that the first contacting surface 122a is inclined at an angle greater than 45° to the first extension surface 21*f*, while the second contacting surface 122*b* is inclined at an angle greater than 45° to the second extension surface 21*g*.

The first hole 25A formed in the opposing portion 22 and the pin 35 in the detachable member 30 can be omitted. Alternatively, the first hole 24A formed in the opposing portion 22 and the pin 34 in the detachable member 30 can be omitted. Even if one of these two sets of pins/holes is omitted from the configuration, it is possible to prevent such situations from occurring, in which the detachable member 30 moves along the first and second contacting surfaces 22*a* and 22*b* such that there occur sliding motions between the first and third contacting surfaces 22*a* and 30*a*, and between the second and fourth contacting surfaces 22*b* and 30*b*.

Figure 13:
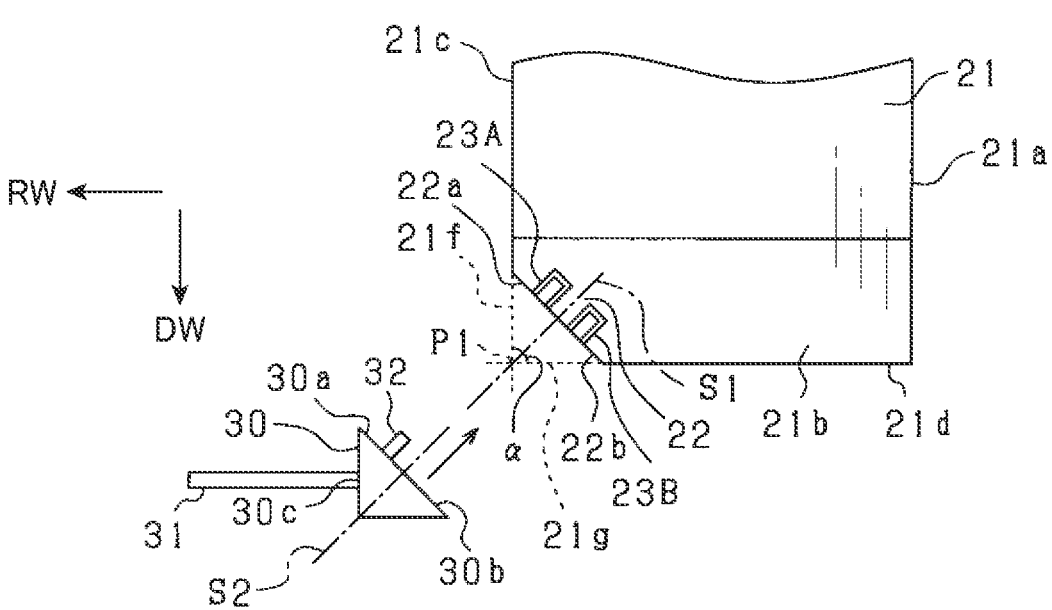
FIG. 13 is a side view pictorially illustrating a modification of the connector.

As shown in FIG. 13, the first enclosure-side connector 23A may be arranged to open in the diagonal direction that the first contacting surface 22*a* of the opposing portion 22 is exposed outside. Correspondingly, the second enclosure-side connector 23B is also positioned so that it opens at an angle in the direction that the second contacting surface 22*b* of the facing portion 22 is exposed outside. The second enclosure-side connector 23B is formed in a structure symmetrical to the first enclosure-side connector 23A with respect to the plane S1. The second enclosure-side connector 23B has the same shape as the first enclosure-side connector 23A and is located in a position and orientation symmetrical to the first enclosure-side connector 23A with respect to the plane S1.

In this example shown in FIG. 13, the cable-side connector 32 is also arranged to extend in a predetermined width in a direction perpendicular to the third contacting surface 30*a*. The cable-side connector 32 can be connected to the first enclosure-side connector 23A with the cable drawn portion 30*c* facing the rear surface 21*c* of the enclosure 21. With the cable-side connector 32 connected to the first enclosure-side connector 23A, the third contacting surface 30*a* can be touched to the first contacting surface 22*a* of the opposing portion 22, and the fourth contacting surface 30*b* can be touched to the second contacting surface 22*b* of the opposing portion 22.

On the other hand, with the cable drawn portion 30*c* facing the bottom surface 21*d* of the enclosure 21, the cable-side connector 32 can be connected to the second enclosure-side connector 23B. With the cable-side connector 32 connected to the second enclosure-side connector 23B, the fourth contacting surface 30*b* can be touched to the first contacting surface 22*a* of the opposing portion 22 and the third contacting surface 30*a* can be touched to the second contacting surface 22*b* of the opposing portion 22.

According to this configuration, the direction in which the cable-side connector 32 is connected to the first enclosure-side connector 23A (diagonal direction of the arrow) is perpendicular to the contacting surfaces 22*a*, 22*b*, 30*a*, 30*b*. This prevents sliding between the first contacting surface 22*a* and the third contacting surface 30*a*, and between the second contacting surface 22*b* and the fourth contacting surface 30*b*. Therefore, even without a guide mechanism to regulate or prevent such sliding motions, excessive force can be prevented from acting on these connectors 23A, 32 when connecting the cable-side connector 32 to the first enclosure-side connector 23A. The same effect can be achieved when connecting the cable-side connector 32 to the second enclosure-side connector 23B.

Figure 14:
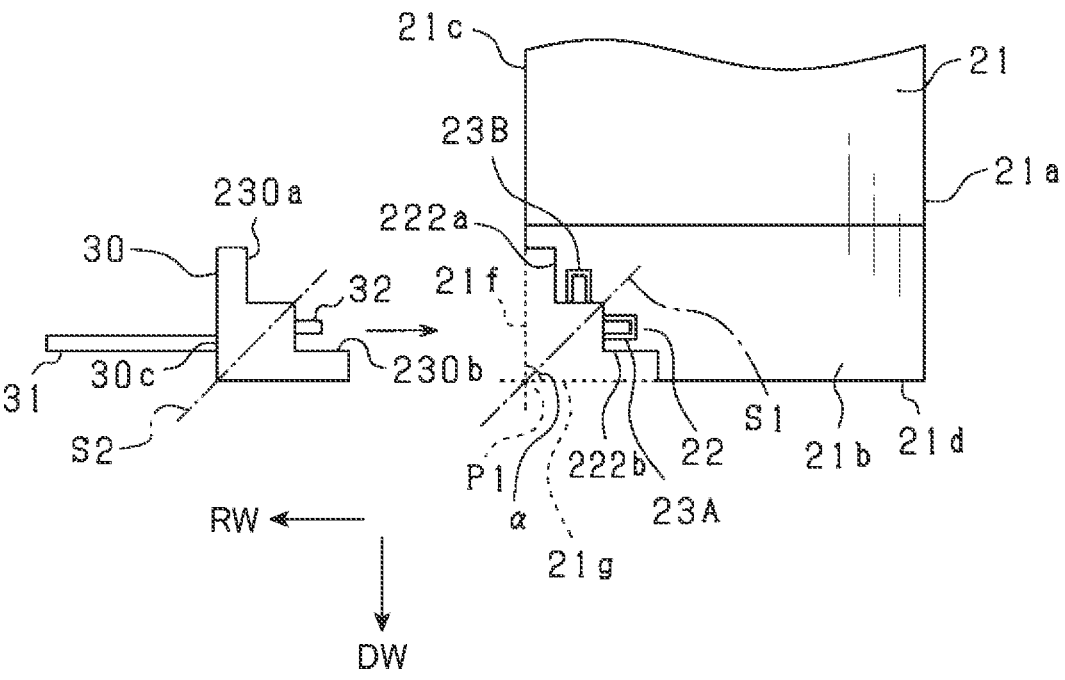
FIG. 14 is a side view pictorially illustrating a further modification of both the opposing portion and the detachable member.

Furthermore, as in the example shown in FIG. 14, a surface configuration can be adopted in which a first contacting surface 222*a* and a second contacting surface 222*b* are mutually perpendicular to each other. The first contacting surface 222*a* is parallel to the first extension surface 21*f*. The second contacting surface 222*b* is parallel to the second extension surface 21*g*. In this case, the opposing portion 22 is also symmetrical with respect to the plane S1 (predetermined plane) that bisects the angle α (90 degrees) formed by the first extension surface 21*f* and the second extension surface 21*g*. In other words, the first contacting surface 222*a* and the second contacting surface 222*b* have a symmetrical position and configuration with respect to the plane S1. The first enclosure-side connector 23A is provided on the opposite side of the first contacting surface 222*a* (same side as the second contacting surface 222*b*) to the plane S1. The second enclosure-side connector 23B is provided on the opposite side of the second contacting surface 222*b* (same side as the first contacting surface 222*a*) to the plane S1.

Furthermore, corresponding to the surface shape presented by this opposing portion 22, the shape and size of a third contacting surface 230*a* of the detachable member 30 is identical (or nearly identical) to the shape and size of the first contacting surface 222*a*. The shape and size of a fourth contacting surface 230*b* of the detachable member 30 is the same (or nearly the same) as the shape and size of the second contacting surface 222*b*. In this case, the detachable member 30 is also formed to have a symmetrical three-dimensional shape with respect to the plane S2. The third contacting surface 230*a* and the fourth contacting surface 230*b* are plane symmetrical with respect to the plane S2. The cable-side connector 32 is provided on the opposite side of the third contacting surface 230*a* (same side as the fourth contacting surface 230*b*) to the plane S2.

This example shown in FIG. 14 can also produce the same effects as the embodiment. Furthermore, the direction in which the cable-side connector 32 is connected to the first enclosure-side connector 23A (direction of the arrow) and the contacting surfaces 222*a*, 230*a* are perpendicular. This allows sliding between the first contacting surface 222*a* and the third contacting surface 230*a* to be restrained. Therefore, even without a guide mechanism, when connecting the cable-side connector 32 to the first enclosure-side connector 23A, it is not necessary to apply excessive pressing force to these connectors 23A, 32 to prevent sliding. The same effect can be achieved when connecting the cable-side connector 32 to the second enclosure-side connector 23B.

In the above example, the cable-side connector 32 can be selectively connected to the first enclosure-side connector 23A or the second enclosure-side connector 23B. In that configuration, sealing members for sealing, from the outside, the first enclosure-side connector 23A, the second enclosure-side connector 23B and the cable-side connector 32 may be provided in the opposing portion 22 or 20 the detachable member 30 may be provided.

Figure 15:
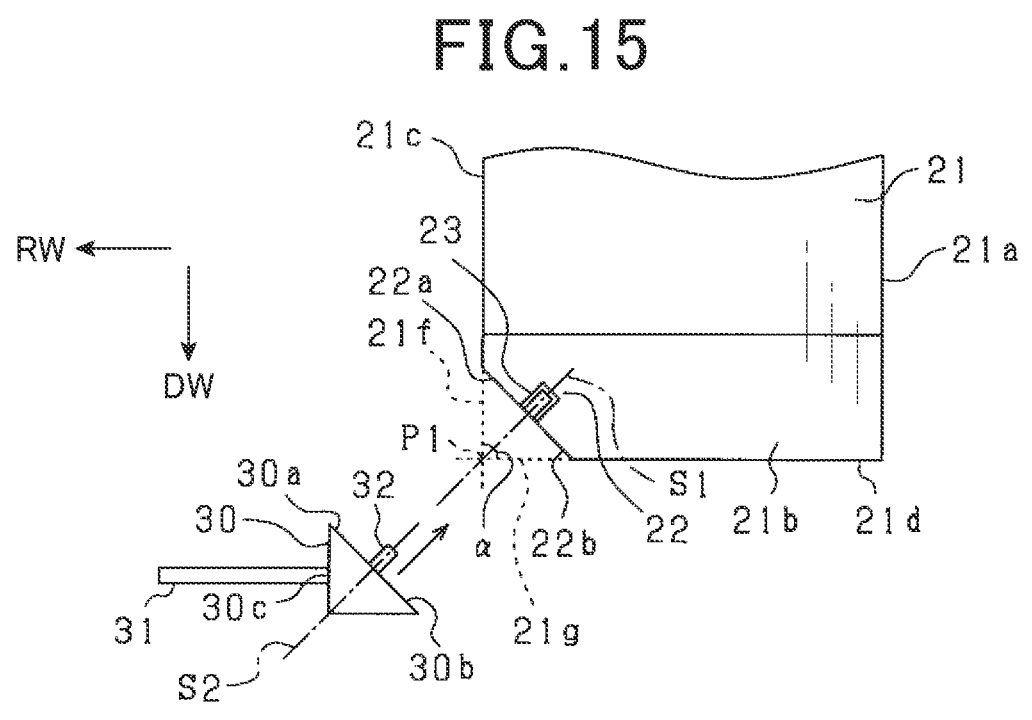

In addition, as in the example shown in FIG. 15, one enclosure-side connector 23 may be opened from the first and second contacting surfaces 22*a* and 22*b* of the opposing portion 22 in the direction those surfaces face. That is, only one enclosure-side connector 23 may be placed. In this configuration, the enclosure-side connector 23 is also formed in a symmetrical position and structure with respect to the plane S1.

On the other hand, corresponding to the enclosure-side connector 23, the cable-side connector 32 is arranged to extend in a predetermined width in a direction perpendicular to the third and fourth contacting surfaces 30*a* and 30*b*. The cable-side connector 32 is formed in a symmetrical position and structure with respect to the plane S2. The cable-side connector 32 can be connected to the enclosure-side connector 23 with the cable drawn portion 30*c* facing the rear surface 21c of the enclosure 21. Therefore, when the cable-side connector 32 is connected to the enclosure-side connector 23, the third contacting surface 30a of the detachable member 30 can be touched to the first contacting surface 22a of the opposing portion 22, and at the same time, the fourth contacting surface 30b of the detachable member 30 can be touched to the second contacting surface 22b of the opposing portion 22.

Although not shown in FIG. 15, the cable-side connector 32 can be connected to the enclosure-side connector 23 with the cable drawn portion 30c facing the bottom surface 21d of the enclosure 21. When the cable-side connector 32 is connected to the enclosure-side connector 23, the fourth contacting surface 30b of the detachable member 30 can be touched to the first contacting surface 22a of the opposing portion 22, and at the same time, the third contacting surface 30a of the detachable member 30 can be touched to the second contacting surface 22b of the opposing portion 22.

In the example shown in FIG. 15, it is possible to selectively realize the case where the cable-side connector 32 is connected to the enclosure-side connector 23 with the cable drawn portion 30c facing the rear surface 21c of the enclosure 21 and the case where the cable-side connector 32 is connected to the enclosure-side connector 23 with the cable drawn portion 30c facing the lower 21d of the enclosure 21. However, in those two connection states, the orientation of the cable-side connector 32 relative to the enclosure-side connector 23 is 180° different.

This can be solved by providing a dip switch on the area sensor 20. In other words, a circuit configuration that switches the input path of power and signals from the cable-side connector 32 using a dip switch can be adopted. As another measure, an electrical mechanism can be provided to automatically determine the orientation of the cable-side connector 32. This electrical mechanism may employ a circuit configuration that switches the input path of power and signals from the cable-side connector 32.

It is common for a reverse connection prevention structure to be provided to prevent the cable-side connector from being connected in the opposite direction to the enclosure-side connector. However, in such a configuration, even if the reverse connection prevention structure is not provided, the cable-side connector 32 can be connected to the enclosure-side connector 23 even if it is rotated 180° (left to right or upside down).

When the cable drawn portion 30c faces the rear surface 21c and the cable-side connector 32 is connected to the enclosure-side connector 23, or when the cable drawn portion 30c faces the bottom surface 21d and the cable-side connector 32 is connected to the enclosure-side connector 23, the detachable member 30 shields the enclosure-side connector 23 and cable-side connector 32 from the outside.

According to this example shown in FIG. 15, it is possible to achieve the same effect as the embodiment.

In addition, the direction in which the cable-side connector 32 is connected to the enclosure-side connector 23 (diagonally as indicated by the arrow) and the contacting surfaces 22a, 22b, 30a, 30b are perpendicular. This prevents or suppresses sliding between the first contacting surface 22a and the third contacting surface 30a, and between the second contacting surface 22b and the fourth contacting surface 30b, which tends to occur during connection. Therefore, even if no guide mechanism is provided to regulate their sliding motions, when connecting the cable-side connector 32 to the enclosure-side connector 23 with the cable drawn portion 30c facing the rear surface 21c, no excessive force is applied to these connectors 23A, 32, and such excessive force can be suppressed. The same effect can be achieved when connecting the cable-side connector 32 to the enclosure-side connector 23 with the cable drawn portion 30c facing the bottom surface 21d.

In addition, there is no need to provide two enclosure-side connectors on the opposing portion 22; only one enclosure-side connector 23 is required. This simplifies the configuration for connecting the cable-side connector 32 to the enclosure-side connector 23.

Furthermore, in the various configurations of the detachable member 30 described above, the screw holes 26A, 27A, 26B and 27B are formed in the opposing portion 22, the insertion holes 36 and 37 are formed in the detachable member 30, and the area sensor 20 can be equipped with the screws 38 and 39 (see FIG. 11). That is, with the cable drawn portion 30c facing the rear surface 21c and the cable-side connector 32 connected to the enclosure-side connector 23, or with the cable drawn surface 30c facing the bottom surface 21d and the cable-side connector 32 connected to the enclosure-side connector 23, the area sensor 20 is equipped with a fastener that can tighten the detachable member 30 and secure the detachable member 30 to the opposing portion 22. Therefore, after connecting the cable-side connector 32 to the enclosure-side connector 23 with the cable drawn portion 30c facing the rear surface 21c or the cable drawn portion 30c facing the bottom surface 21d, the opposing portion 22 and the detachable member 30 can be prevented from shifting from each other. Therefore, the enclosure-side connector 23 and cable-side connector 32 can be prevented from being damaged when a user catches on the cable 31 or other events occur.

The remaining portions of the opposing portion 22, other than the portions forming the first contacting surfaces 22a, 122a and 222a, and the second contacting surfaces 22b, 122b and 222b, may not be symmetrical with respect to the plane S1 (the predetermined plane). The remaining portions of the detachable member 30, other than the portions forming the third contacting surfaces 30a, 130a and 230a, and the fourth contacting surfaces 30b, 130b and 230b, may not be symmetrical with respect to the plane S2.

With the cable drawn portion 30c facing the rear surface 21c and the cable-side connector 32 connected to the enclosure-side connector 23, or with the cable drawn portion 30c facing the bottom surface 21d and the cable side connector 32 connected to the enclosure side connector 23, a sealing member that seals between the enclosure-side connector 23/cable-side connector 32 and the outside may be provided in the opposing portion 22 or detachable member 30.

Instead of the fastener functionally configured by the screw holes 26A, 27A, 26B and 27B, the insertion holes 36 and 37, and the screws 38 and 39, a hook and loop fastener that can be attached and detached from the surface can be provided on the opposing portion 22 and the detachable member 30. The opposing portion 22 and the detachable member 30 can also be bonded with double-sided tape or other means.

The direction in which the cable 31 is led out from the area sensor 20 is not limited to behind and below the area sensor 20.

For example, the cable 31 can be led out to the side and below the area sensor 20. In such a case, the opposing portion 22 should be provided on the enclosure 21 so that it faces the intersection position where the extended surface (first extended surface) extending the side surface 21b (first surface) of the enclosure 21 and the extended surface (second extended surface) extending the bottom surface 21d (second surface) of the enclosure 21 intersect. The cable 31 can also be led out behind and to the side of the area sensor 20. In such a case, the opposing portion 22 should be provided in the enclosure 21 so that it faces the intersection position where the extended surface (first extended surface) extending the rear surface 21c (first surface) and the extended surface (second extended surface) extending the side surface 21b (second surface) intersect. The shape of the enclosure 21 is not limited to a square (rectangular) column, but may also be triangular, hexagonal, or other shapes. In that case, the cable 31 can still be led out behind and below, to the side and below, or to the rear and to the side of the area sensor 20.

Moreover, the three-dimensional shape of the detachable member 30 is not limited to those described in the forgoing various embodiments and their modifications. Any shape of a detachable member can be adopted as long as i) its three-dimensional size is smaller in a space enclosed by the first and second extension surfaces 21f and 21g and the parts of the side surfaces, ii) the third and fourth contacting surfaces 30a and 30b can cover an area of the opposing portion 22 in which the first and second enclosure-side connectors 22A and 22A when the detachable member 30 is attached to the opposing portion 22 of the enclosure 21, and iii) the cable-side connector 32 can be connected to any of the first and second enclosure-side connectors 22A and 22A whey the detachable member 30 is attached to the opposing portion 22 in any of the two directions RW and DW. In such cases, there are formed steps of junctions between the detachable member and the rear and bottom surfaces 21c and 21d, but the functions of the detachable member can be kept in the same way as those described.

The application of the area sensor 20 is not limited to ranging radar, which uses a laser beam to scan a detection range. The area sensor 20 may be applied to a ranging radar (object detection device) that scans the detection range with millimeter waves, a ranging radar (object detection device) that scans the detection range with ultrasonic waves, or an object detection device that detects objects based on images taken by a camera in the detection range. The area sensor 20 may be applied to a ranging radar (object detection device) that scans the detection range with millimeter waves, a ranging radar (object detection device) that scans the detection range with ultrasonic waves, or an object detection device that detects objects based on images taken by a camera in the detection range. Even in these applications, the orientation and location of the object detection device may be restricted depending on the relationship with the monitoring area where the device is to be installed. With such restrictions, the appropriate direction of withdrawal of the cable from the object detection device often has to be changed depending on the installation configuration of the object detection device. Therefore, it is effective to select and implement the above embodiments and their modifications as appropriate for those various applications. The area sensor 20 is not limited to indoor locations, but may also be installed outdoors.

The foregoing embodiments and their modifications may be combined to the extent possible.

BRIEF DESCRIPTION OF PARTIAL REFERENCE SIGNS LIST

20 . . . area sensor (object detection device),
21 . . . enclosure,
21c . . . rear surface (first surface)
21d . . . bottom surface (second surface)
21f . . . first extension surface

21g . . . second extension surface
22 . . . opposing portion,
22a . . . first contacting surface,
22b: Second contacting surface,
23 . . . enclosure-side connector,
23A . . . first enclosure-side connector
23B . . . second enclosure-side connector
30, 230, 330 . . . detachable member,
30a . . . third contacting surface,
30b . . . fourth contacting surface,
30c . . . cable-drawn portion,
31 . . . cable,
32 . . . cable-side connector
122a . . . first contacting surface,
122b . . . second contacting surface
130a . . . third contacting surface
130b . . . fourth contacting surface
222a . . . first contacting surface,
222b . . . second contacting surface
230a . . . third contacting surface
230b . . . fourth contacting surface

What is claimed is:

1. An object detection device to which a cable is connected, the object detection device comprising:
an enclosure having a first surface and a second surface, and an opposing portion, the first and second surfaces each being extended to have first and second extension surfaces which cross at a virtual crossing position with each other, either one of the first and second surfaces being directly fixed to a, the opposing portion being formed on the enclosure to be opposed to the crossing position;
a detachable member is provided with a cable-drawn portion from which the cable is drawn outside and a cable-side connector connected to the cable,
wherein the detachable member is detachable to the opposing portion selectively between a first directed state where the cable-drawn portion is directed to cross the first surface and a second state where the cable-drawn portion is directed to cross the second surface;
a first enclosure-side connector arranged at the opposing portion and connectable to the cable-side connector in the first directed state; and
a second enclosure-side connector arranged at the opposing portion and connectable to the cable-side connector in the second directed state,
wherein the detachable member is formed to shield, from an outside of the object detection device, the first enclosure-side connector, the second enclosure-side connector, and the cable-side connector when first and second connected states are established, the first connected state being a state where the cable-side connector is connected to the first enclosure-side connector, the second connected state being a state where the cable-side connector is connected to the second enclosure-side connector.

2. The object detection device according to claim 1, wherein
the opposing portion includes first and second contacting surfaces which are symmetrical about a predetermined plane bisecting an angle provided between the first extension surface and the second extension surface,
the detachable member includes a third contacting surface allowed to contact the first contacting surface and a fourth contacting surface allowed to contact the second contacting surface, which contacts are accomplished in the first connected states, the fourth contacting surface is allowed to contact the first contacting surface and the third contacting surface is allowed to contact the second contacting surface, which contacts are accomplished in the second connected state.

3. The object detection device according to claim 2, comprising a first guide mechanism, the first guide mechanism is adapted to guide the cable-side connector toward the first enclosure-side connector, restrict a slide motion caused between the first and third contacting surfaces, and restrict a slide motion caused between the second and fourth contacting surfaces; and a second guide mechanism, the second guide mechanism is adapted to guide the cable-side connector toward the second enclosure-side connector, restrict a slide motion caused between the second and third contacting surfaces, and restrict a slide motion caused between the first and fourth contacting surfaces.

4. The object detection device according to claim 3, wherein the first guide mechanism includes a pin, the pin being arranged on the detachable member and extended in a connection direction given by the cable-side connector, the pin being formed to be insertable in a first hole, the first hole being formed in the opposing portion and formed to extend in a first connecting direction along which the cable-side connector is connected to the first enclosure-side connector, the second guide member includes a pin which is also insertable into a second hole, the second hole being formed in the opposing portion and formed to extend in a second connecting direction along which the cable-side connector is connected to the second enclosure-side connector.

5. The object detection device according to claim 4, comprising a fastener configured to tighten the detachable member to the opposing portion for fixing in both of the first and second connected states.

6. The object detection device according to claim 1, comprising a first guide mechanism, the first guide mechanism is adapted to guide the cable-side connector toward the first enclosure-side connector, restrict a slide motion caused between the first and third contacting surfaces, and restrict a slide motion caused between the second and fourth contacting surfaces; and a second guide mechanism, the second guide mechanism is adapted to guide the cable-side connector toward the second enclosure-side connector, restrict a slide motion caused between the second and third contacting surfaces, and restrict a slide motion caused between the first and fourth contacting surfaces.

7. The object detection device according to claim 6, wherein the first guide mechanism includes a pin, the pin being arranged on the detachable member and extended in a connection direction given by the cable-side connector, the pin being formed to be insertable in a first hole, the first hole being formed in the opposing portion and formed to extend in a first connecting direction along which the cable-side connector is connected to the first enclosure-side connector, the second guide member includes a pin which is also insertable into a second hole, the second hole being formed in the opposing portion and formed to extend in a second connecting direction along which the cable-side connector is connected to the second enclosure-side connector.

8. The object detection device according to claim 7, comprising a fastener configured to tighten the detachable member to the opposing portion for fixing in both of the first and second connected states.

9. The object detection device according to claim 2, wherein the first guide mechanism includes a pin, the pin being arranged on the detachable member and extended in a connection direction given by the cable-side connector, the pin being formed to be insertable in a first hole, the first hole being formed in the opposing portion and formed to extend in a first connecting direction along which the cable-side connector is connected to the first enclosure-side connector, the second guide member includes a pin which is also insertable into a second hole, the second hole being formed in the opposing portion and formed to extend in a second connecting direction along which the cable-side connector is connected to the second enclosure-side connector.

10. The object detection device according to claim 9, comprising a fastener configured to tighten the detachable member to the opposing portion for fixing in both of the first and second connected states.

11. An object detection device to which a cable is connected, the object detection device comprising:

an enclosure having a first and a second surface, and an opposing portion, the first and second surfaces each being extended to have first and second extension surfaces which crosses at a virtual crossing position each other, either one of the first and second surfaces being directly fixed to a fixed member, the opposing portion being formed on the enclosure to be opposed to the crossing position;

a detachable member is provided with a cable-drawn portion from which the cable is drawn outside and a cable-side connector connected to the cable, wherein the detachable member is detachable to the opposing portion selectively between a first directed state where the cable-drawn portion is directed to cross the first surface and a second state where the cable-drawn portion is directed to cross the second surface; and an enclosure-side connector arranged at the opposing portion and configured to be connectable to the cable-side connector in both the first and second directed states, wherein the detachable member is configured to shield, from an outside of the object detection device, both the enclosure-side connector and the cable-side connector in first and second directed and connected states, the first directed and connected state is a state where the cable-drawn portion is directed to the first surface and the cable-side connector is connected to the enclosure-side connector, the second directed and connected state being a state where the cable-drawn portion is directed to the second surface and the cable-side connector is connected to the enclosure-side connector.

12. The object detection device according to claim 11, wherein the opposing portion includes first and second contacting surfaces which are symmetrical about a predetermined plane bisecting an angle provided between the first extension surface and the second extension surface, the detachable member includes a third contacting surface allowed to contact the first contacting surface and a fourth contacting surface allowed to contact the second contacting surface, which contacts are accomplished in the first directed and connected state, the fourth contacting surface is allowed to contact the first contacting surface and the third contacting surface is allowed to contact the second contacting surface, which contacts are accomplished in the second directed and connected state.

13. The object detection device according to claim 12, comprising a fastener that fastens the detachable member such that the detachable member is fixed to the opposing portion.

14. The object detection device according to claim 11, comprising a fastener that fastens the detachable member such that the detachable member is fixed to the opposing portion.

\* \* \* \* \*